United States Patent
Johri et al.

(10) Patent No.: US 9,327,722 B1
(45) Date of Patent: May 3, 2016

(54) VEHICLE TORQUE CONTROL

(71) Applicant: FORD GLOBAL TECHNOLOGIES, LLC, Dearborn, MI (US)

(72) Inventors: Rajit Johri, Canton, MI (US); Bernard D. Nefcy, Novi, MI (US); Daniel Scott Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/546,680

(22) Filed: Nov. 18, 2014

(51) Int. Cl.
*B60W 10/06* (2006.01)
*B60W 10/08* (2006.01)
*B60W 10/11* (2012.01)
*B60W 20/00* (2016.01)
*F16H 61/16* (2006.01)

(52) U.S. Cl.
CPC ............. *B60W 20/50* (2013.01); *B60W 10/06* (2013.01); *B60W 10/11* (2013.01); *B60W 20/30* (2013.01); *B60W 20/40* (2013.01); *F16H 61/16* (2013.01); *B60W 2510/06* (2013.01); *B60W 2510/081* (2013.01); *B60W 2510/1005* (2013.01); *B60W 2540/10* (2013.01); *B60W 2710/021* (2013.01); *B60W 2710/06* (2013.01); *B60W 2710/1005* (2013.01); *F16H 2061/163* (2013.01); *Y10S 903/93* (2013.01)

(58) Field of Classification Search
None
See application file for complete search history.

(56) References Cited

U.S. PATENT DOCUMENTS

| 4,843,551 | A | 6/1989 | Milunas |
| 5,741,202 | A | 4/1998 | Huber |
| 6,125,316 | A | 9/2000 | Sasaki et al. |
| 8,423,230 | B2 | 4/2013 | Steinhauser et al. |
| 2008/0195266 | A1* | 8/2008 | Le Neindre ............... B60K 6/48 701/22 |
| 2013/0218392 | A1* | 8/2013 | Aizawa .................. B60L 3/0023 701/22 |
| 2013/0296102 | A1* | 11/2013 | Banker ................ B60W 10/196 477/4 |
| 2015/0088349 | A1* | 3/2015 | Akashi .................. B60W 10/08 701/22 |

* cited by examiner

*Primary Examiner* — Edwin A Young
(74) *Attorney, Agent, or Firm* — David B. Kelley; Brooks Kushman P.C.

(57) ABSTRACT

A vehicle includes a powertrain having an electric machine operatively coupled to a transmission and selectively coupled to an engine, and a controller. The controller, while operating the powertrain in an electric mode and in response to an accelerator pedal position initiating a transmission ratio change that results in a request to operate the powertrain in a hybrid mode and an engine start fault, outputs a cancellation request to cancel the transmission ratio change.

15 Claims, 2 Drawing Sheets

VEHICLE TORQUE CONTROL

TECHNICAL FIELD

This disclosure relates to techniques for controlling vehicle torque.

BACKGROUND

Hybrid electric vehicles (HEVs) may be provided with an internal combustion engine and an electric machine in communication with a high voltage battery. Depending on vehicle operating conditions, the electric machine may selectively alternate between serving as a source to or load upon the powertrain. The timing of this alternate operation may be used to affect fuel economy.

SUMMARY

A vehicle includes a powertrain and a controller. The powertrain has an electric machine operatively coupled to a transmission and selectively coupled to an engine. The controller, while operating the powertrain in an electric mode and in response to an accelerator pedal position initiating a transmission ratio change that results in a request to operate the powertrain in a hybrid mode and an engine start fault, outputs a cancellation request to cancel the transmission ratio change.

A vehicle includes an electric machine coupled to a transmission, an engine selectively coupled to the electric machine, and a controller. The controller, while the vehicle is in electric mode and in response to an engine fault state, an electric machine speed greater than a speed threshold, and an accelerator pedal input triggering a transmission downshift and an engine start, outputs a command to abort a transmission ratio change associated with the transmission downshift, and outputs a command to return to a previous transmission ratio.

A method of controlling a vehicle includes, in response to an engine fault state and an accelerator pedal input triggering a transmission downshift that results in a request for an engine start while the vehicle is in electric mode, interrupting a transmission ratio change associated with the transmission downshift and returning to a previous transmission ratio.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
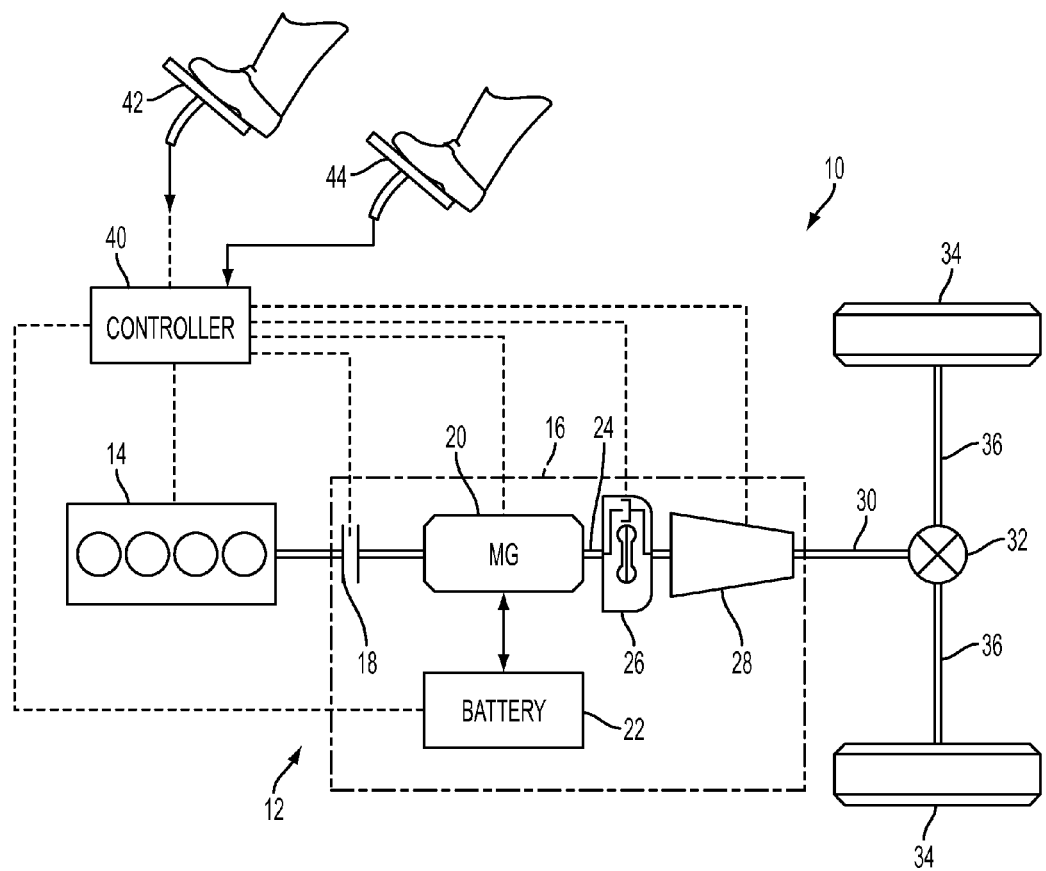
FIG. 1 is a schematic diagram of a hybrid electric vehicle.

Referring to FIG. 1, a schematic diagram of a vehicle 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations.

The vehicle 10 may include a powertrain 12. The powertrain 12 may include an engine 14 operatively coupled to a transmission 16. The engine 14 may be configured to drive the transmission 16. As will be described in further detail below, the transmission 16 may include a disconnect clutch 18, an electric machine such as an electric motor/generator (M/G) 20, an associated traction battery 22, a transmission input shaft 24, a launch clutch or torque converter 26, and a multiple step-ratio automatic transmission, or transmission gearbox 28.

The engine 14 may be selectively coupled to the M/G 20 via the disconnect clutch 18. The engine 14 and the M/G 20 may both be capable of providing motive power for the vehicle 10 by providing torque to the gearbox 28.

The disconnect clutch 18 may disengage to decouple the engine 14 from the remainder of the powertrain 12 such that the M/G 20 may operate as the sole drive source for the vehicle 10. When the disconnect clutch 18 is at least partially engaged, power flow from the engine 14 to the M/G 20 or from the M/G 20 to the engine 14 is possible. For example, when the disconnect clutch 18 is engaged, the M/G 20 may operate as a generator to convert rotational energy provided by a crankshaft through the M/G 20 into electrical energy to be stored by the traction battery 22.

The M/G 20 may be implemented by any one of a plurality of types of electric machines. For example, M/G 20 may be a permanent magnet synchronous motor. Power electronics may condition direct current power provided by the battery 22 to the requirements of the M/G 20. For example, power electronics may provide three phase alternating current to the M/G 20.

As further shown in the representative embodiment of FIG. 1, an output shaft 30 may be connected to a differential 32. The differential 32 may drive a pair of wheels 34 via axles 36 connected to the differential 32. The differential 32 may transmit torque to each wheel 34 while permitting slight speed differences such as when the vehicle 10 turns or corners.

Different types of differentials or similar devices may be used to distribute torque from the powertrain to one or more wheels. In some applications, torque distribution may vary depending on the particular operating mode or condition, for example.

The transmission 16 may be configured as a step-ratio transmission using multiple friction elements for transmission gear ratio shifting. The transmission 16 may be configured to produce multiple forward and reverse gears via multiple gearing elements within the gear box 28.

The transmission gearbox 28 may include a plurality of gear sets (not shown) that are selectively placed in different gear ratios by the selective engagement of friction elements such as shift elements including clutches having clutch elements, and brakes (not shown). The different gear ratios provided by the gear sets may establish multiple drive ratios that may correspond to different overall transmission ratios.

A controller 40 may be provided and configured to control the friction elements of the transmission 16, more specifically the gear box 28. The controller 40 may be provided with a shift schedule that may connect and/or disconnect friction elements of the gear sets responsive to a driver request provided by an accelerator pedal 42, a brake pedal 44, or a gear selector (not shown).

The controller 40 may be configured to dictate the operational states of the powertrain 12. In at least one embodiment, a larger control system includes several controllers. The individual controllers, or the control system, may be influenced by various other controllers throughout the vehicle 10 in which a vehicle system controller (VSC) operates at a higher hierarchy relative to other subservient controllers. The VSC output may directly or indirectly dictate or influence a number of vehicle functions such as starting/stopping the engine 14, operating the M/G 20 to provide wheel torque or recharge the traction battery 22 or start the engine 14, selecting or scheduling transmission gear shifts, etc.

For example, the VSC may receive data from and issue commands to a transmission control module (TCM) that is in direct communication with components of the transmission 16. Examples of other subservient controllers that may operate lower in a controller hierarchy compared to the VSC include a brake system control module (BSCM), a high voltage battery energy control module (BECM), as well as other controllers that are responsible for various vehicle functions. The VSC may further operate to verify data received from other controllers.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The VSC may communicate signals to and/or from the TCM. Additionally, the VSC may communicate with other vehicle controllers as discussed above, or directly with vehicle sensors and/or components including the engine 14, the power electronics.

Although not explicitly illustrated, those of ordinary skill in the art will recognize various functions or components that may be controlled by the VSC within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 18, torque converter bypass clutch, and transmission gear box 28, and the like.

Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The controller 40 may be provided with control logic configured to operate the powertrain 12. The control logic may control the amount of torque provided to the wheels 34 by controlling a transmission ratio between the transmission input shaft 24 and the transmission output shaft 30 based on driver requests. The driver request may be a gear selection (PRNDL) input through a gear selector, accelerator pedal position input through an accelerator pedal 42, brake pedal position input through a brake pedal 44, battery temperature, voltage, current, and battery state of charge (SOC).

The controller 40 may interpret the driver request from the accelerator pedal 42, to determine a driver's intention for demanded powertrain torque or powertrain power to propel the vehicle 10. The controller 40 may allocate torque split commands between the engine 14 and/or the M/G 20 to satisfy the driver request.

In general, depressing and releasing the accelerator pedal 42 may generate an accelerator pedal position signal that may be interpreted by the controller 40 as a demand for increased power/torque or decreased power/torque, respectively. Based at least upon input from the accelerator pedal 42, the controller 40 may operate the powertrain 12 in various modes to satisfy the driver request.

The controller 40 may be configured to operate the powertrain 12 in a first mode. While operating the powertrain 12 in the first mode, the disconnect clutch 18 may isolate the engine 14 from the remainder of the powertrain 12. Combustion in the engine 14 may be disabled or otherwise OFF during the first mode, in order to conserve fuel. The traction battery 22 may transmit stored electrical energy through power electronics to the M/G 20 such that the M/G 20 acts as the sole power source to propel the vehicle 10.

In the first mode, the controller 40 may issue commands to power electronics such that the M/G 20 is enabled to provide positive or negative torque to the transmission input shaft 24. The first mode of powertrain operation in which the M/G 20 is the sole motive source may be referred to as an "electric mode".

The controller 40 may be further configured to operate the powertrain 12 in a second mode. While operating the powertrain 12 in the second mode, the disconnect clutch 18 may be at least partially engaged to operatively couple the engine 14 to the M/G 20. The coupling may transfer a portion of the engine torque through the disconnect clutch 18 to the M/G 20, and then from the M/G 20 through the torque converter 26 and gearbox 28. Combustion in the engine 14 may be enabled or otherwise ON during the second mode.

In the second mode, the controller 40 may issue commands to power electronics such that the M/G 20 may assist the engine 14 by providing additional torque to the transmission input shaft 24. The controller 40 may issue commands to allocate a torque output of both the engine 14 and the M/G 20 such that the combination of both torque outputs satisfies an accelerator pedal 42 input from the driver. The second mode of powertrain operation may be referred to as a "hybrid mode."

The controller 40 may receive an accelerator pedal position signal from the accelerator pedal 42 that may request a large powertrain output torque or power that may only be satisfied by requesting or initiating a transmission downshift. This situation may be referred to as a "power-on downshift". The transmission downshift may change from a higher gear number to a lower gear numbers, e.g. from $4^{th}$ gear to $3^{rd}$ gear.

A transmission ratio change may be associated with the transmission downshift from a first transmission ratio to a second transmission ratio. The first transmission ratio may be a lower ratio as compared to the second transmission ratio, which may be a higher ratio. The transmission ratio change may occur in a synchronous clutch-to-clutch downshift as a first friction element is engaged and a second friction element is disengaged. The downshift may increase transmission torque multiplication and increase the engine 14 operating speed.

A first friction element or first shift element associated with the first transmission ratio may be referred to as an off-going clutch. A second friction element or second shift element associated with the second transmission ratio may be referred to as an oncoming clutch. The transmission ratio change from the first transmission ratio to the second transmission ratio may be achieved by releasing the off-going clutch while engaging the oncoming clutch.

In controlling the transmission downshift, the controller 40 may command a decrease in the off-going clutch pressure that may decrease the torque carrying capacity of the off-going clutch. The controller 40 may command an increase in the oncoming clutch pressure that may increase the torque carrying capacity of the oncoming clutch such that the transmission ratio change may be completed.

In some scenarios, the controller 40 may be operating the powertrain 12 in electric mode when the operator initiates a power-on downshift. Scenarios in which a power-on downshift is initiated while the powertrain 12 is operated in electric mode may include lane change maneuvers, overtake maneuvers, entering an expressway and desiring to accelerate to a speed to not impede the flow of traffic.

A power-on downshift may begin with an inertial phase where the engine/motor is accelerated from a lower engine speed associated with the present gear to a new higher engine speed associated with the target gear. During the inertial phase, hydraulic pressure provided to the offgoing clutch is reduced which may bring the offgoing clutch to a state of slip. Unless the engine/motor torque is increased, the reducing offgoing clutch pressure may result in reduction of output torque. If the reduction in output torque is excessive, this may adversely impact the drivability of the vehicle 10.

During the inertial phase, hydraulic pressure may be commanded to be provided to the oncoming clutch in preparation for the torque transfer phase. As a transmission input speed approaches the synchronous speed, the torque transfer phase may begin. During the torque transfer phase, torque may be transferred from the offgoing clutch to the oncoming clutch by gradually reducing the hydraulic pressure provided to the offgoing clutch and simultaneously increasing the hydraulic pressure provided to the oncoming clutch. The shift may end as the hydraulic pressure provided to the oncoming clutch is further increased to full pressure, such that the oncoming clutch is operating at full torque carrying capacity.

In an attempt to accelerate the vehicle 10 to the desired speed based on the current accelerator pedal position, the controller 40 may request a larger amount of powertrain torque than the combination of the current transmission ratio and the M/G 20 may be able to provide. The request for additional powertrain torque may initiate a transmission ratio change from a first transmission ratio to a second transmission ratio. However, additional torque may be required from the engine 14 to complete the transmission ratio change because the available torque of the M/G 20 may be unable to complete the transmission downshift.

The M/G 20 may have an output torque profile that may correlate M/G rotational speed to M/G output torque. The maximum output torque of the M/G 20 may remain flat as the M/G rotational speed increases. Above a certain M/G rotational speed, the maximum output torque of the M/G 20 may begin to decrease even with increased M/G rotational speed. The operational point at which the M/G output torque is at a maximum and output power is at a maximum may be referred to as the "constant torque knee point."

Should the M/G 20 be operating at a rotational speed greater than a threshold rotational speed at which the M/G 20 is operating beyond the constant torque knee point, the M/G output torque may be considered saturated. The saturated M/G output torque may prevent the completion of the transmission downshift and the associated transmission ratio change without additional torque being provided by the engine 14.

The controller 40 may monitor or determine the M/G rotational speed by directly measuring the M/G rotational speed or measuring a transmission element speed such as the impeller speed. The transmission element speed may serve as a proxy for the M/G rotational speed when the M/G 20 is operatively coupled to the gearbox 28. The controller 40 may compare the transmission element speed while operating the powertrain 12 at the first transmission ratio to the expected or target transmission element speed at the second transmission ratio. If the expected or target transmission element speed at the second transmission ratio may place the M/G 20 at an operational point beyond the constant torque knee point, the M/G output torque may further reduce which may not be sufficient to complete the transmission downshift without starting the engine 14 and the transmission downshift may be delayed until the engine 14 has started and the powertrain 12 is operated in the second mode or hybrid mode.

The engine start may be coordinated with the transmission downshift. The coordination may enable the transmission downshift to be completed without excessively prolonging the duration of the transmission downshift. The coordination may also inhibit a delay in the transmission downshift which may reduce the powertrain output torque and provide the opposite of the driver expected performance for a power-on downshift.

The controller 40 may be provided with a fault mode mitigation strategy should the engine start not be coordinated with the transmission downshift. A fault mode may be encountered if the engine start is unable to be accomplished. A fault to start the engine 14 may indicate an engine start fault state or a second mode fault that may prevent the powertrain 12 from entering the second mode of operation.

In at least one embodiment, the controller 40 may cancel or abort the transmission downshift in response to an engine start fault and the M/G 20 output torque unable to complete the transmission ratio change associated with the transmission downshift. The controller 40 may output a cancellation request or command to cancel the transmission ratio change from a first transmission ratio to a second transmission ratio.

The controller 40 may command an increase in the off-going clutch pressure such that the off-going clutch torque carrying capacity increases. The controller 40 may command a decrease in the oncoming clutch pressure such that the oncoming clutch torque carrying capacity decreases. The strategy may essentially reverse the transmission ratio change from the first transmission ratio to the second transmission ratio, responsive to the cancellation request.

The reversing of the transmission ratio change may attempt to return the transmission ratio to the first transmission ratio. The off-going clutch torque carrying capacity may be increased such that substantially all of the torque is being transmitted by the off-going clutch. The controller 40 may maintain the first transmission ratio until the engine 14 is able to be started and the powertrain 12 is able to operate in the second mode.

In response to the returning to/maintaining the first transmission ratio, the controller 40 may output a request/command to operate the powertrain 12 in the second mode. The request/command may include an engine start request. The controller 40 may then output a request/command for a transmission downshift having an associated transmission ratio change from a first transmission ratio to a second transmission ratio. If the engine 14 has fully started, the transmission ratio change may be completed. However, if the engine 14 is unable to fully start, the controller 40 may abort the transmission downshift and output for display an indicator indicative of an engine or powertrain fault.

In at least one embodiment, the controller 40 may output a command to abort a transmission ratio change associated with the power-on transmission downshift, in response to various triggering conditions. The triggering conditions may include an engine start fault and an electric machine (M/G) rotational speed greater than a speed threshold, while the powertrain 12 is operating in electric mode.

The command to abort a transmission ratio change associated with the power-on transmission downshift may command a decrease in a second clutch element pressure associated with a target transmission ratio. The decrease in the second clutch element pressure may decrease the second clutch element torque carrying capacity. The second clutch element may be the oncoming clutch element.

The controller 40 may output a command to return to a previous transmission ratio. The command to return to the previous transmission ratio may command an increase in a first clutch element pressure associated with the previous transmission ratio. The increase in the first clutch element pressure may increase the first clutch element torque carrying capacity. The first clutch element may be the off-going clutch element.

The controller 40 may output an engine start command in response to the transmission ratio returning to the previous transmission ratio. The previous transmission ratio may be returned to when the first clutch element torque carrying capacity has increased such that generally all of the torque is being transmitted by the first clutch element. The engine start command may include a request to operate the powertrain 12 in hybrid mode.

In response to the engine 14 starting responsive to the engine start request, the controller 40 may output a transmission downshift command. The transmission downshift command may be associated with a transmission ratio change from the previous transmission ratio to the target transmission ratio or a new target transmission ratio associated with a current accelerator pedal position greater than a threshold. The transmission ratio change may be completed after the engine has fully started.

Figure 2:
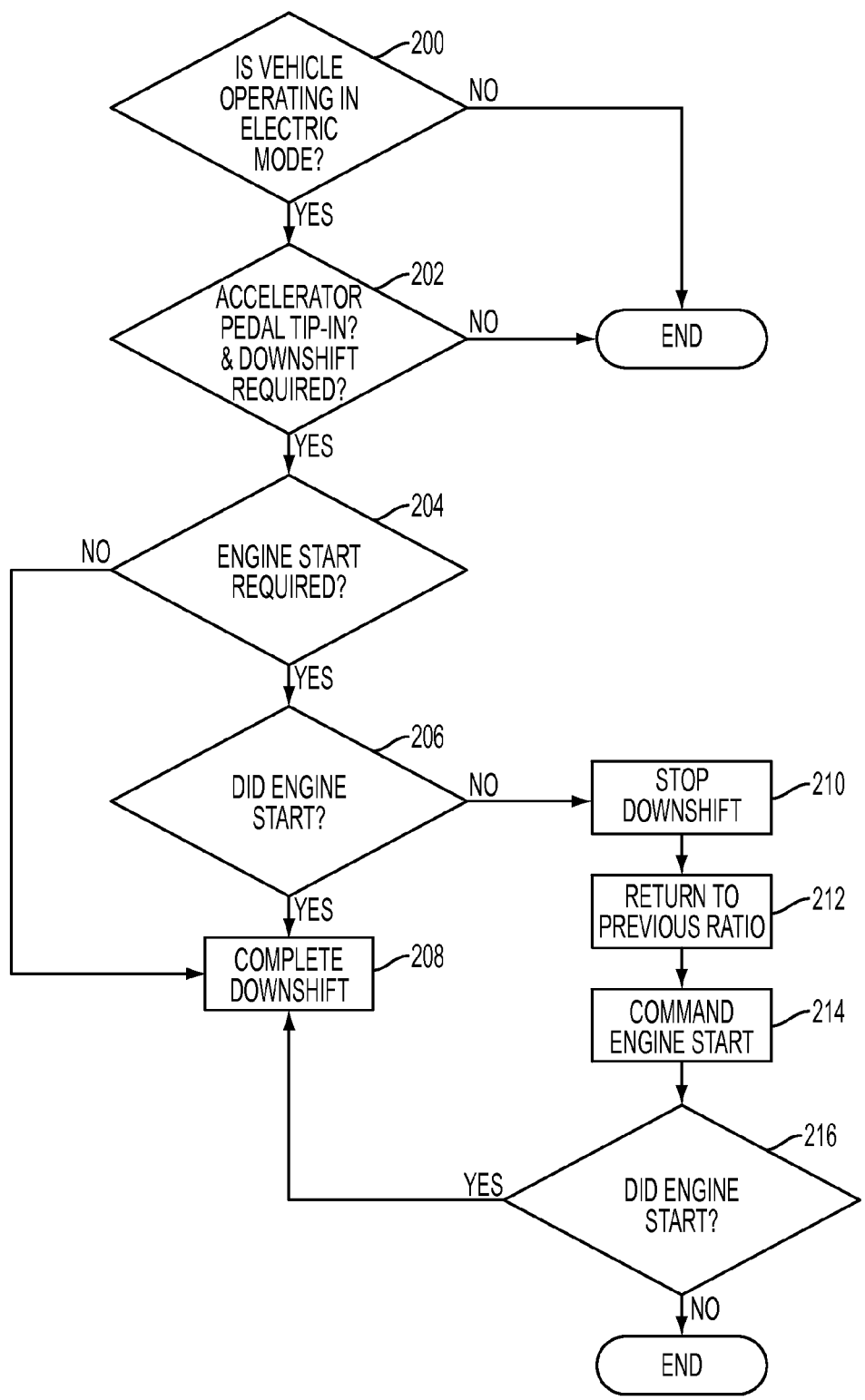
FIG. 2 is a flowchart of a method of controlling a vehicle.

FIG. 2 is a flowchart of a method of controlling a vehicle. The method may be implemented by the controller 40 based on data received by the controller 40 or by controllers subservient to the controller 40. At block 200, the method may determine if the vehicle 10 or powertrain 12 is operating in the first mode or the electric mode. Should the vehicle 10 or powertrain 12 not be operating in electric mode, the method may end. If the vehicle 10 or powertrain 12 is operating in electric mode, the method may continue to block 202.

At block 202, the method may determine if there has been a change in accelerator pedal position greater than threshold. This change may indicate that there has been an accelerator pedal tip-in trigger that may request a transmission downshift. Should the change in accelerator pedal position not be greater than a threshold or not require a transmission downshift, the method may end. If the change in accelerator pedal position is greater than a threshold and require a transmission downshift, the method may continue to block 204.

At block 204, the method may determine if an engine start may be required to complete the transmission downshift and satisfy the driver demanded torque associated with the accelerator pedal position. Should an engine start not be required to complete the transmission downshift, the downshift may be completed or the method may end. If an engine start is required to complete the transmission downshift, the method may continue to block 206.

At block 206, the method may determine if the engine 14 was able to start in response to the engine start command. Should the engine 14 have started, the method may continue to block 208 and complete the transmission downshift and operate the powertrain 12 to satisfy the driver demanded torque associated with the accelerator pedal position. If the engine was unable to start in response to the engine start command, the method may continue to block 210.

At block 210, the method may stop the transmission ratio change associated with the transmission downshift. The stopping of the transmission ratio change associated with the transmission downshift may include decreasing an on-coming shift element pressure to decrease an on-coming shift element torque carrying capacity. As the on-coming shift element pressure is decreasing, substantially simultaneously the method may continue to block 212.

At block 212 the method may return the transmission 16 to a previous transmission ratio. The returning to the previous transmission ratio may include increasing an off-going shift element pressure to increase the off-going shift element torque carrying capacity, such that the previous transmission ratio is maintained. Upon returning to the previous transmission ratio, the method may continue to block 214.

At block 214, the method may command an engine start responsive to the return to the previous transmission ratio. The method may continue to block 216, where the method determines if the engine 14 has started. Should the engine 14 have started, the method may and complete the transmission downshift at block 208. If the engine 14 did not start, the method may end and output a warning indicative of an engine fault.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a powertrain having an electric machine operatively coupled to a transmission and selectively coupled to an engine; and
 a controller programmed to, while operating the powertrain in an electric mode and in response to an accelerator pedal position initiating a transmission ratio change that results in a request to operate the powertrain in a hybrid mode and an engine start fault, output a cancellation request to cancel the transmission ratio change.

2. The vehicle of claim 1, wherein the controller is further programmed to maintain a current transmission ratio in response to the cancellation request.

3. The vehicle of claim 1, wherein the engine is decoupled from the electric machine in the electric mode.

4. The vehicle of claim 1, wherein the engine is coupled to the electric machine in the hybrid mode.

5. A vehicle comprising:
an electric machine coupled to a transmission;
an engine selectively coupled to the electric machine; and
a controller programmed to, while the vehicle is in electric mode and in response to an engine fault state, an electric machine speed greater than a speed threshold, and an accelerator pedal input triggering a transmission downshift and an engine start,
output a command to abort a transmission ratio change associated with the transmission downshift, and
output a command to return to a previous transmission ratio.

6. The vehicle of claim 5, wherein the controller is further programmed to output an engine start command in response to a return to the previous transmission ratio.

7. The vehicle of claim 5, wherein the command to abort a transmission ratio change associated with the transmission downshift decreases a second clutch element pressure to decrease a second clutch element torque carrying capacity.

8. The vehicle of claim 7, wherein the command to return to a previous transmission ratio increases a first clutch element pressure.

9. The vehicle of claim 8, wherein the first clutch element is an off-going clutch element and the second clutch element is an oncoming clutch element.

10. The vehicle of claim 5, wherein the engine is decoupled from the electric machine in the electric mode.

11. A method of controlling a vehicle comprising:
in response to an engine fault state and an accelerator pedal input triggering a transmission downshift that results in a request for an engine start while the vehicle is in electric mode, interrupting a transmission ratio change associated with the transmission downshift and returning to a previous transmission ratio.

12. The method of claim 11, wherein the interrupting includes decreasing an on-coming shift element pressure to decrease an on-coming shift element torque carrying capacity.

13. The method of claim 11, wherein returning to a previous transmission ratio includes increasing an off-going shift element pressure to increase an off-going shift element torque carrying capacity.

14. The method of claim 11 further comprising starting an engine in response to the returning to a previous transmission ratio.

15. The method of claim 14 further comprising completing the transmission ratio change after the starting an engine.

* * * * *